United States Patent [19]

Hasegawa et al.

[11] Patent Number: 4,608,827
[45] Date of Patent: Sep. 2, 1986

[54] COOLING SYSTEM OF AN INTERNAL COMBUSTION ENGINE HAVING A TURBO-CHARGER

[75] Inventors: Mitsuru Hasegawa; Tamotsu Fukuda, both of Toyota, Japan

[73] Assignee: Toyota Jidosha Kabushiki Kaisha, Aichi, Japan

[21] Appl. No.: 719,552

[22] Filed: Apr. 3, 1985

[30] Foreign Application Priority Data

Apr. 13, 1984 [JP] Japan ................................. 59-73025

[51] Int. Cl.⁴ .............................................. F02B 33/44
[52] U.S. Cl. .................................... 60/605; 123/41.31
[58] Field of Search .......................... 60/605; 417/407; 123/563, 41.31

[56] References Cited

U.S. PATENT DOCUMENTS

| | | | |
|---|---|---|---|
| 3,229,456 | 1/1966 | Gratzmuller | 123/563 X |
| 3,673,798 | 7/1972 | Kuehl | 60/605 |
| 4,107,927 | 8/1978 | Gordon, Jr. et al. | 60/605 |

Primary Examiner—William R. Cline
Assistant Examiner—Richard R. Cole
Attorney, Agent, or Firm—Parkhurst & Oliff

[57] ABSTRACT

A water jacket in the turbo-charger is positioned at the same level or higher than a water jacket in an engine cylinder head. The turbo-charger cooling water circulation passageway includes a water volume or tank positioned at a level higher than the turbo-charger cooling portion, and the volume or tank is connected to a cooling water reservoir tank via a pressure relief valve which is opened when pressure in the volume or tank exceeds a predetermined value to supply cooling water to the volume or tank.

11 Claims, 6 Drawing Figures

COOLING SYSTEM OF AN INTERNAL COMBUSTION ENGINE HAVING A TURBO-CHARGER

BACKGROUND OF THE INVENTION

1. Field of the Invention

The present invention relates to a cooling system of an internal combustion engine having a turbo-charger. More particularly, it relates to a system for cooling the turbo-charger by circulating a part of the engine cooling water through a cooling water circulation passageway of the turbo-charger.

2. Description of the Related Art

A turbo-charger for an internal combustion engine includes an exhaust turbine impeller which is exposed to and heated by the high temperature of engine exhaust gas passing through the turbo changer. Therefore, the shaft bearings of the turbo-charger are also heated because of the heat transmitted from the turbine impeller. A bearing housing of the turbo-charger is, therefore, usually provided with cooling water jackets in the vicinity of the turbine impeller, and when the engine is running a part of the engine cooling water is forcibly circulated therethrough to cool the bearing portions of the turbo-charger. Namely, a cooling water passage is branched from the downstream side of a water pump to introduce the cooling water into the water jackets. Therefore, when the engine is running, the cooling water is compulsorily fed into the cooling system of the turbo-charger. However, when the engine is stopped, the performance for cooling the turbo-charger depends largely on a level at which the turbo-charger is positioned, since the bearing portions thereof are then cooled by a so-called natural or gravity circulation. Consequently, if the turbo-charger is positioned lower than the cylinder head of the engine, a natural circulation is established through conventional piping for the cooling water, which cools the the interior of the engine as well as the turbo-charger. However, if the turbo-charger is positioned higher than the engine cylinder, the cooling water may be boiled in the water jacket of the turbo-charger, thus filling the jackets with vapor (gas) which will prevent the circulation of the cooling water, when the engine is stopped after having been driven in a heavy load condition. Therefore, positioning the turbo-charger at a higher level than that of the engine with conventional piping for circulating cooling water causes an increase in the temperature of the bearing portions and a deterioration in the lubricant.

To avoid the above-mentioned problems, an electric water pump can be added exclusively for the cooling water piping of the turbo-charger, and this water pump is driven after the engine is stopped. This solution may provide effective cooling, but the electric water pump is very expensive per se, and the capacities of the alternator and battery must be increased to cope with the extra load incurred thereby.

SUMMARY OF THE INVENTION

An object of the present invention is to provide a cooling system of an internal combustion engine having a turbo-charger capable of overcoming the disadvantages of the above-mentioned conventional cooling system of an engine.

Another object of the present invention is to provide a cooling system of an internal combustion engine capable of cooling the bearing portions of the turbo-charger after the engine is stopped, capable of increasing the flexibility of the arrangement of the turbo-charger, and capable of supplying cooling water easily to the engine cooling system.

One aspect of the present invention provides a cooling system of an internal combustion engine having a turbo-charger, comprising a cooling water circulation passageway filled with cooling water for cooling the engine including at least a cylinder head cooling portion, a cooling water circulation passageway for cooling the turbo-charger including a turbo-charger cooling portion, and means for supplying a part of the engine cooling water to the turbo-charger cooling water circulation passageway and returning it from there to the engine cooling water circulation passageway.

In this aspect of the present invention, the turbo-charger cooling portion is positioned at the same level as or higher than the cylinder head cooling portion of the engine, the turbo-charger cooling water circulation passageway includes a water volume or tank positioned at a level higher than the turbo-charger cooling portion, and this volume or tank is connected to a cooling water reservoir tank via a pressure relief valve which is opened when pressure in the volume or tank exceeds a predetermined value, to supply cooling water to the volume.

Another aspect of the present invention provides a cooling system of an internal combustion engine having a turbo-charger, comprising an engine cooling water circulation passageway filled with cooling water including at least a cylinder head cooling portion, a water pump located at a water outlet of the engine for forcibly circulating the cooling water through the engine, and a thermostat valve located at a downstream side of the water pump, which valve is open to allow the cooling water to pass through a radiator when the temperature of the cooling water is increased, a turbo-charger cooling water circulation passageway, and means for supplying a part of the engine cooling water to the turbo-charger cooling water circulation passageway and returning it from there to the engine cooling water circulation passageway.

In this aspect of the present invention, the turbo-charger cooling portion is positioned at the same level as or higher than the cylinder head cooling portion of the engine, the turbo-charger cooling water circulation passageway includes a water volume or tank positioned at a level higher than the turbo-charger cooling portion, and this volume or tank is connected to a cooling water reservoir tank via a pressure relief valve which is opened when the pressure in the volume exceeds a predetermined value, to supply cooling water to the volume.

DESCRIPTION OF THE PREFERRED EMBODIMENTS

Figure 1:
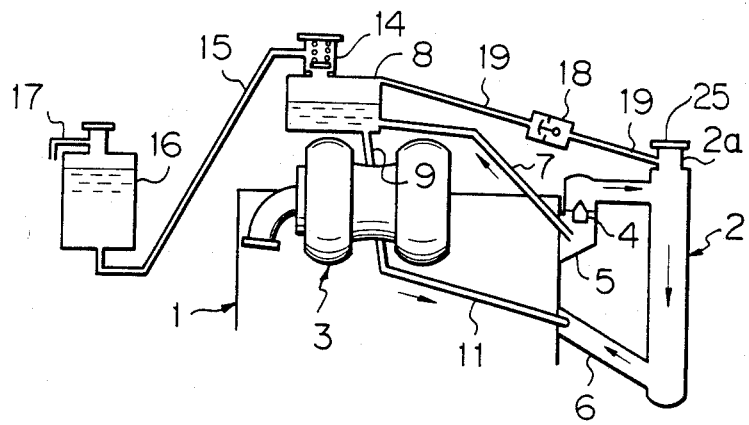
FIG. 1 is a schematic view illustrating a first embodiment of a cooling system for an internal combustion engine having a turbo-charger according to the present invention.
Figure 2:
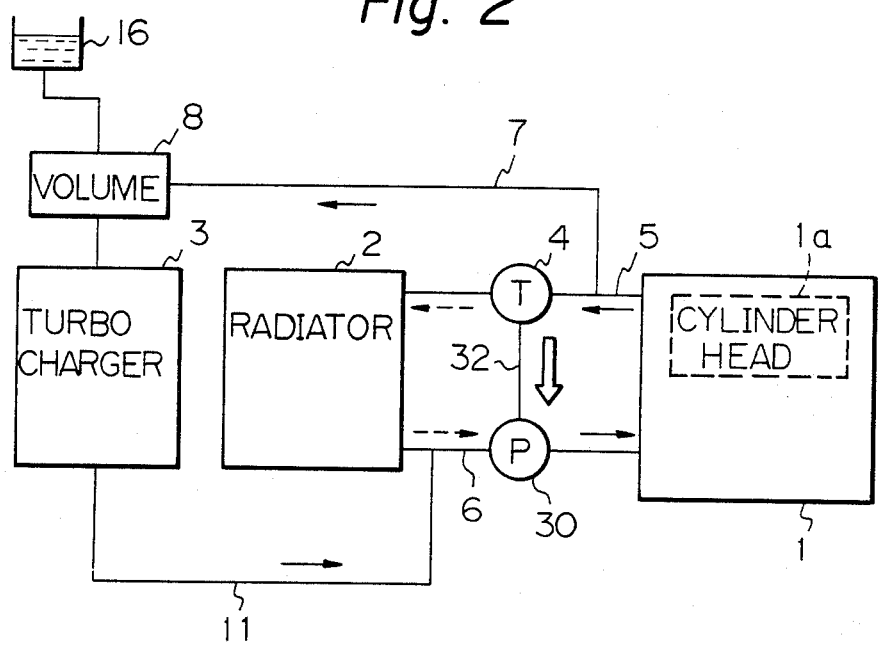
FIG. 2 is a block diagram of the cooling system shown in FIG. 1.

Referring now to FIGS. 1 and 2 illustrating a first embodiment of the present invention, reference numeral 1 denotes a body of an internal combustion engine; 2, a radiator; 3, a turbo-charger; 4, a thermostat valve; 5, a cooling water outlet, 6, a cooling water inlet; 30, a water pump (FIG. 2); and 32, a bypass passage (FIG. 2). An engine cooling water circulation or main passageway is filled with cooling water and comprises at least a cylinder head cooling portion 1a (FIG. 2), the thermostat valve 4 located at the cooling water outlet 5, the radiator 2, and the water pump 30 (FIG. 2). The engine cooling water is forcibly circulated through various portions of the engine, including the cylinder head cooling portion 1a, by the water pump 30 (FIG. 2). When the temperature of the cooling water exceeds a predetermined value, the thermostat valve 4 is opened to allow the cooling water to pass through the radiator 2 as indicated by broken line arrows in FIG. 2. When the thermostat valve 4 is closed, the cooling water flows directly through the bypass passage 32 to the water pump 30, as shown by the broken line arrow in FIG. 2, and thus does not flow through the radiator 2.

Figure 3:
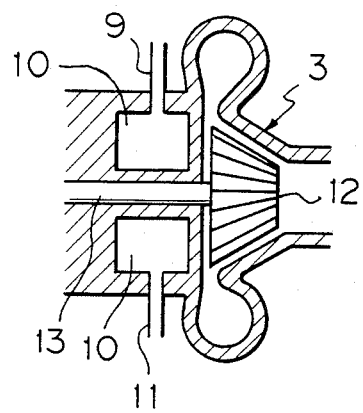
FIG. 3 is a cross-sectional view illustrating a portion in the vicinity of a turbine impeller in the turbo-charger.

According to the present invention, the turbo-charger 3 having a cooling portion is situated in such a way that the cooling portion or jacket 10 (FIG. 3) is positioned at a level higher than the cylinder head cooling portion 1a of the engine 1. A turbo-charger cooling water circulation passageway comprises a water hose 7 branched from the water outlet 5 of the main passageway at the upstream side of the thermostat valve 4. A part of the engine cooling water passed through the interior of the engine flows via the hose 7 into a water tank or volume 8 and then, via a water hose 9 connected to a bottom of the water volume 8, into the cooling portion or water jacket 10 (FIG. 3) of the turbo-charger 3, from where the cooling water flows into the engine water inlet 6 via a hose 11. As seen from FIG. 3, the cooling water jacket 10 is arranged in the turbo-charger in such a manner that it effectively cools a shaft bearing portion 13 adjacent to a turbine impeller 12, which is particularly subject to very high temperatures and thus tends to become very hot.

The water tank or volume 8 is situated at a level higher than that of the cooling portion of the turbo-charger 3, i.e., the cooling water jacket 10. Consequently, the water hose 9 extends gradually upward from the water jacket 10 to the bottom of the water tank 8. The water tank 8 is connected via a pressure relief valve 14 provided at an upper wall thereof and through a hose 15 to a bottom of a cooling water reservoir tank 16 having a pressure relief port 17 at an upper portion thereof. An upper portion 2a of the radiator 2 is also connected to the water tank 8 via a hose 19 having a one-way valve 18 therein.

According to the above-mentioned arrangement, when the engine is running, the cooling water is always fed to the cooling water jacket 10 of the turbo-charger 3 to cool the shaft bearing portion 13 of the turbo-charger 3 by means of the water pump 30 (FIG. 2), regardless of the engine running conditions, i.e., regardless of whether the thermostat valve 4 is open or closed.

When the engine is stopped, especially just after the engine has been driven in a heavy load condition, steam (a mixture of gas and liquid) formed from water boiled in the water jacket 10 (FIG. 3) of the turbo-charger 3 is drawn up to the water tank 8 positioned above the water jacket 10 via the hose 9. This sets up a syphoning action by which the cooling water in the water tank 8 is fed into the water jacket 10 of the turbo-charger 3 also via the hose 9, or cooling water in the engine water inlet 5 is fed into the water jacket 10 via the hose 7 and the water tank 8, and thus the shaft bearing portion 13 (FIG. 3) of the turbo-charger is always cooled. When the pressure of the vapor or steam (gas) in the water tank exceeds a certain value, the pressure relief valve 14 is opened to release the gas to the cooling water reservoir tank 16. This also sets up a syphoning action whereby the water in the tank 16 is fed to the tank 8, via the hose 15, and then to the water jacket 10 of the turbo-charger 3 via the hose 9, and thus the water jacket 10 is continuously filled with cooling water.

Air accumulated in the upper portion 2a of the radiator 2, when the engine is stopped, can be released to the water tank 8 through the hose 19, since the one-way valve 18 is opened when the air pressure in that portion 2a reaches a predetermined value. The one-way valve 18 also serves to prevent the cooling water from flowing to the radiator 2 from the water tank 8, thus maintaining the performance of the engine during the warm-up period, especially, when the engine is driven under a low temperature condition, i.e., when the thermostat valve 4 remains closed. The water hose 19 must extend gradually upward toward the water tank 8 from the upper portion 2a of the radiator 2.

When the amount of cooling water in the water tank (volume) 8 is reduced, cooling water in the reservoir tank 16 is supplied to the water tank 8 by a syphoning action which is effected when the pressure relief valve 14 is opened in accordance with the pressure of steam (gas) in the water tank 8, to release this pressure to the cooling water reservoir tank 16. Thus, the cooling water is effectively supplied not only to the turbo-charger cooling water circulation passageway, but also to the engine cooling water circulation passageway. Although the size (volume) of the water tank 8 depends on the size or performance of the turbo-charger 3, the size must be at least large enough to hold sufficient cooling water to fully cool the turbo-charger, especially just after the engine is stopped, and to have a cross-sectional area at least larger than a sum of the cross-sectional areas of the water hoses 7 and 9 connected thereto.

Figure 4:
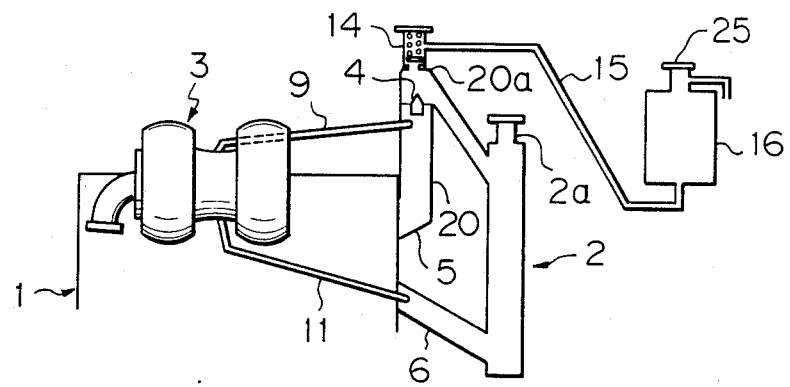
FIG. 4 is a schematic view illustrating a second embodiment of a cooling system of the present invention.

FIG. 4 illustrates a second embodiment of the present invention, wherein a housing 20 of the upstream side (lower side, in FIG. 4) of the thermostat valve 4 is vertically extended in such a manner that a portion of this housing 20 serves as a water volume or tank, instead of the water tank 8 which is a feature of the first embodiment (FIG. 1) of the present invention. In this embodiment, a water hose 9 extended gradually upward from the upper portion of the turbo-charger 3 and connected to a portion of the housing 20 at the upsteam side (lower side, in FIG. 4) of the thermostat valve 4. The housing portion 20a above the thermostat valve 4, which is at a level higher than the upper portion 2a of the radiator 2, is connected via a pressure relief valve 14 provided thereon and a hose 15 to a cooling water reservoir tank 16. In this second embodiment, a water tank as shown in the first embodiment at reference numeral 8 is not necessary, but a larger space for the housing 20 is necessary, since this housing 20 must be larger than the engine water inlet 5 shown in FIG. 1 for the first embodiment.

In the embodiment illustrated in FIG. 4, when the engine is stopped, steam accumulated in the turbo-charger 3 is released to the housing 20. Then, when the thermostat valve 4 is open and the pressure of the steam in the housing 20a above the thermostat valve 4 exceeds a predetermined value, the pressure relief valve 14 is opened and the steam is released to the reservoir tank 16.

Figure 5:
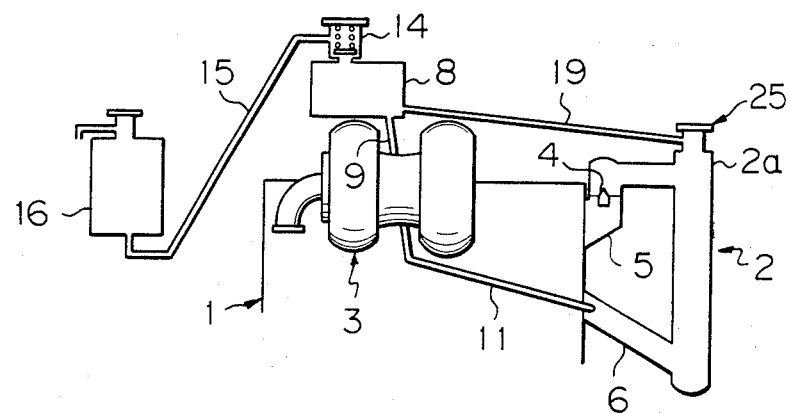
FIG. 5 is a schematic view illustrating a third embodiment of a cooling system of the present invention; and, FIG. 6 is a schematic view illustrating a fourth embodiment of a cooling system of the present invention.

FIG. 5 illustrates a third embodiment of the present invention, wherein the hose 7 and the one-way valve 18 in the first embodiment shown in FIG. 1 are both omitted. In this embodiment, water for cooling the turbo-charger flows from the upper portion 2a of the radiator 2 via a hose 19 into a water tank 8, and is circulated through the cooling water system via a hose 9, a turbo-charger 3, a hose 11, and an engine inlet 6 so as to cool the turbo-charger 3. However, in this embodiment, when the engine is cold, i.e., when the thermostat valve 4 is closed, the cooling water cannot be circulated through the turbo-charger 3.

Figure 6:
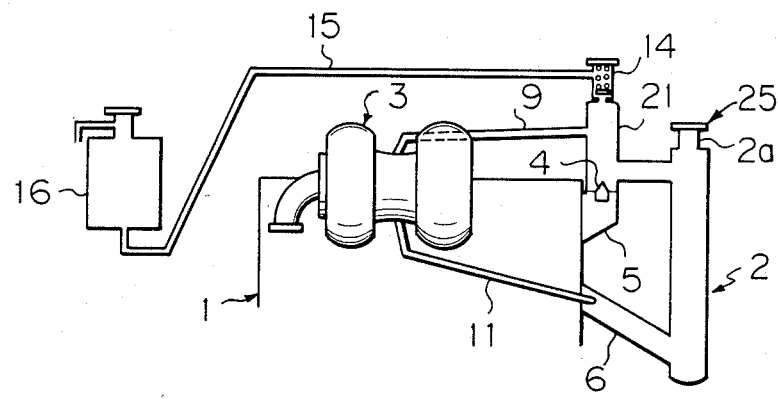

FIG. 6 illustrates a fourth embodiment of the present invention, wherein the downstream side (upper side, in FIG. 6) housing 21 of the thermostat valve 4 is extended upward, and a water hose 9 is connected between the housing 21 and the upper portion of the turbo-charger 3. The hose 9 is extended gradually upward from the turbo-charger 3 to the housing 21, in the same manner as in the second embodiment shown in FIG. 4. In this embodiment also, the cooling water can be circulated through the turbo-charger 3 only when the thermostat valve 4 is open, as in the third embodiment shown in FIG. 5. When the engine is stopped, the steam or vapor in the turbo-charger 3 is released via the water hose 9 to the housing 21.

In the embodiments mentioned in this description, in the upper portion 2a of the radiator 2 an opening is usually provided with a cap 25, which cap 25 is removable for filling cooling water into the radiator 2. However, this system can be a so-called sealed cooling water system, and the cap 25 may therefore be not provided.

What is claimed is:

1. A cooling system of an internal combustion engine having a turbo-charger, comprising a cooling water circulation passageway filled with cooling water for cooling the engine including at least a cylinder head cooling portion, a cooling water circulation passageway for cooling the turbo-charger including a turbo-charger cooling portion, and means for supplying a part of the engine cooling water to the turbo-charger cooling water circulation passageway and returning it from there to the engine cooling water circulation passageway, characterized in that the turbo-charger cooling portion is positioned at the same level or higher than the cylinder head cooling portion of the engine, the turbo-charger cooling water circulation passageway includes a water volume positioned at a level higher than said turbo-charger cooling portion, and said volume is connected to a cooling water reservoir tank via a pressure relief valve which is opened when pressure in said volume exceeds a predetermined value to supply cooling water to said volume.

2. A cooling system as set forth in claim 1, wherein said turbo-charger cooling water circulation passageway comprises a water hose extending gradually upward from said turbo-charger cooling portion to said water volume, so that the pressure of steam generated in said turbo-charger cooling portion can be relieved to said volume.

3. A cooling system as set forth in claim 1, wherein said water volume is connected at an upper portion thereof to said cooling water reservoir tank, so that air in said water volume can be relieved to said water reservoir tank when the pressure in said water volume exceeds a predetermined value.

4. A cooling system of an internal combustion engine having a turbo-charger, comprising an engine cooling water circulation passageway filled with cooling water including at least a cylinder head cooling portion, a water pump for forcibly circulating the cooling water through the engine, and a thermostat valve located at a cooling water outlet of the engine, which valve is opened to allow the cooling water to pass through a radiator when the temperature of the cooling water is increased, a turbo-charger cooling water circulation passageway, and means for supplying a part of the engine cooling water to the turbo-charger cooling water circulation passageway and returning it from there to the engine cooling water circulation passageway, characterized in that the turbo-charger cooling portion is positioned at the same level or higher than the cylinder head cooling portion of the engine, the turbo-charger cooling water circulation passageway includes a water volume positioned at a level higher than said turbo-charger cooling portion, and said volume is connected to a cooling water reservoir tank via a pressure relief valve which is opened when pressure in said volume exceeds a predetermined value to supply cooling water to said volume.

5. A cooling system as set forth in claim 4, wherein said turbo-charger cooling water circulation passageway comprises a water hose extending gradually upward from said turbo-charger cooling portion to said water volume, so that the pressure of steam generated in said turbo-charger cooling portion can be relieved to said volume.

6. A cooling system as set forth in claim 4, wherein said water volume is connected at an upper portion thereof to said cooling water reservoir tank, so that air in said water volume can be relieved to said water reservoir tank when the pressure in said water volume exceeds a predetermined value.

7. A cooling system as set forth in claim 4, wherein said turbo-charger cooling water circulation passageway comprises a water hose which connects said water volume to said engine cooling water outlet, at the upstream side of said thermostat valve.

8. A cooling system as set forth in claim 4, wherein said water volume is formed in said engine cooling water outlet, at the upsteam side of said thermostat valve.

9. A cooling system as set forth in claim 8, wherein said engine cooling water outlet is connected, at a position downstream of the thermostat valve which position is at a level higher than said water volume, to said cooling water reservoir tank.

10. A cooling system as set forth in claim 4, wherein said turbo-charger cooling water circulation passageway comprises a water hose which connects said water volume to said engine cooling water circulation passageway at a downstream side of said thermostat valve, i.e., at position upstream of the radiator.

11. A cooling system as set forth in claim 4, wherein said water volume is formed in said engine cooling water outlet, at a position downstream of said thermostat valve which position is at a level higher than said thermostat valve.

* * * * *